(12) United States Patent
Matsuda et al.

(10) Patent No.: US 12,347,311 B2
(45) Date of Patent: Jul. 1, 2025

(54) ROAD MONITORING SYSTEM, ROAD MONITORING DEVICE, AND ROAD MONITORING METHOD

(71) Applicant: NEC Corporation, Tokyo (JP)

(72) Inventors: Yuma Matsuda, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 18/284,709

(22) PCT Filed: Apr. 9, 2021

(86) PCT No.: PCT/JP2021/015007
§ 371 (c)(1),
(2) Date: Sep. 28, 2023

(87) PCT Pub. No.: WO2022/215246
PCT Pub. Date: Oct. 13, 2022

(65) Prior Publication Data
US 2024/0161609 A1    May 16, 2024

(51) Int. Cl.
*G08G 1/052*    (2006.01)
*G02B 6/12*    (2006.01)
*G08G 1/04*    (2006.01)

(52) U.S. Cl.
CPC ......... *G08G 1/052* (2013.01); *G02B 6/12002* (2013.01); *G08G 1/04* (2013.01); *G02B 2006/12138* (2013.01)

(58) Field of Classification Search
CPC ........ G08G 1/052; G08G 1/04; G08G 1/0116; G08G 1/0133; G08G 1/0112; G08G 1/0129
See application file for complete search history.

(56) References Cited

U.S. PATENT DOCUMENTS 6,131,064 A * 10/2000 Vieweg ................ G08G 1/0133
                                                    701/119
10,106,153 B1 * 10/2018 Xiao ...................... B62D 15/02
(Continued)

FOREIGN PATENT DOCUMENTS

CN     107591002 A     1/2018
WO     2020/116030 A1  6/2020
(Continued)

OTHER PUBLICATIONS

International Search Report for PCT Application No. PCT/JP2021/015007, mailed on Jun. 29, 2021.
(Continued)

*Primary Examiner* — Hoi C Lau
(74) *Attorney, Agent, or Firm* — Sughrue Mion, PLLC

(57) ABSTRACT

To improve the accuracy of vehicle speed calculation, the present disclosure extracts, on the basis of an optical signal received from an optical fiber cable laid in a road, a first pattern according to the traveling state of a vehicle on the road in a first time range and a first distance range, generates, on the basis of the first pattern, a second pattern in which the number of time points included in the first time range or the number of positions included in the first distance range has been decreased, and calculates the traveling speed of the vehicle on the road on the basis of the second pattern.

20 Claims, 16 Drawing Sheets

(56) References Cited

U.S. PATENT DOCUMENTS

| | | | | |
|---|---|---|---|---|
| 10,650,648 | B2* | 5/2020 | Englund | G08B 13/186 |
| 11,391,622 | B2* | 7/2022 | Ip | G01H 9/004 |
| 11,450,204 | B2* | 9/2022 | Turato | G08G 1/0116 |
| 11,769,403 | B2* | 9/2023 | Turato | G08G 1/0133 |
| | | | | 340/905 |
| 2005/0060069 | A1* | 3/2005 | Breed | B60W 40/06 |
| | | | | 701/408 |
| 2012/0230629 | A1* | 9/2012 | Hill | G01D 5/35348 |
| | | | | 385/12 |
| 2013/0151297 | A1* | 6/2013 | Zheng | G06Q 10/06 |
| | | | | 701/119 |
| 2014/0350836 | A1* | 11/2014 | Stettner | G01S 17/931 |
| | | | | 356/4.01 |
| 2016/0003946 | A1* | 1/2016 | Gilliland | G01S 17/10 |
| | | | | 356/5.01 |
| 2016/0078760 | A1* | 3/2016 | Crickmore | G08G 1/0116 |
| | | | | 701/117 |
| 2016/0275788 | A1* | 9/2016 | Wu | G08G 1/02 |
| 2017/0309171 | A1* | 10/2017 | Zhao | G08G 1/096838 |
| 2017/0352262 | A1* | 12/2017 | Xu | G08G 1/0133 |
| 2018/0089911 | A1* | 3/2018 | Rath | G07C 5/0808 |
| 2018/0342156 | A1* | 11/2018 | Martin | G08G 1/052 |
| 2019/0057275 | A1* | 2/2019 | Yi | G06V 30/153 |
| 2019/0079526 | A1* | 3/2019 | Vallespi-Gonzalez | |
| | | | | G01S 7/4802 |
| 2019/0120663 | A1* | 4/2019 | Suzaki | H04B 10/85 |
| 2019/0197846 | A1* | 6/2019 | Englund | H04R 23/008 |
| 2020/0249076 | A1* | 8/2020 | Ip | G01H 9/004 |
| 2022/0032943 | A1* | 2/2022 | Yoda | G01H 9/004 |
| 2022/0057255 | A1* | 2/2022 | Hino | H04B 10/2537 |
| 2022/0172611 | A1* | 6/2022 | Turato | H04B 10/073 |
| 2022/0327923 | A1* | 10/2022 | Tanaka | G08G 1/0133 |
| 2022/0415169 | A1* | 12/2022 | Turato | H04B 10/073 |
| 2023/0112149 | A1* | 4/2023 | Iwano | G01H 9/004 |
| | | | | 385/12 |
| 2023/0384149 | A1* | 11/2023 | Matsuda | G01H 9/00 |
| 2024/0161609 | A1* | 5/2024 | Matsuda | G08G 1/0116 |

FOREIGN PATENT DOCUMENTS

| | | |
|---|---|---|
| WO | 2020/257167 A1 | 12/2020 |
| WO | 2021/038695 A1 | 3/2021 |

OTHER PUBLICATIONS

English translation of Written opinion for PCT Application No. PCT/JP2021/015007, mailed on Jun. 29, 2021.

\* cited by examiner

ROAD MONITORING SYSTEM, ROAD MONITORING DEVICE, AND ROAD MONITORING METHOD

This application is a National Stage Entry of PCT/JP2021/015007 filed on Apr. 9, 2021, the contents of all of which are incorporated herein by reference, in their entirety.

TECHNICAL FIELD

The present disclosure relates to, for example, a technique for monitoring an operation of a vehicle by using an optical fiber sensor.

BACKGROUND ART

Optical fiber sensing is a technique of using an optical fiber as a sensor for vibration, temperature, strain, or the like. Examples of an application of optical fiber sensing include traffic flow overlook monitoring. Herein, the traffic flow overlook monitoring is to monitor a status (for example, a vehicle traveling speed, traffic congestion, or the like) of traffic flow at a certain point in time from a bird's eye view in a certain geographic area (for example, a map).

In general, monitoring of traffic flow on a highway is performed by using an existing sensor such as a traffic meter or a closed-circuit television (CCTV). However, there is a problem that installing a sensor in such a way that no blind spot is generated requires a huge number of sensors.

In view of the above, as a complementary technique to an existing sensor, optical fiber sensing can be used instead of installing a huge number of sensors. In traffic flow overlook monitoring using optical fiber sensing, a traveling track of a vehicle is recognized by continuously measuring, for time and distance, a vibration generated by vehicle traveling. A status of traffic flow is monitored by calculating traffic information such as a vehicle speed, from the traveling track. In order to monitor traffic flow with high precision, it is necessary to accurately recognize a traveling track of a vehicle.

One example of a technique for performing traffic flow overlook monitoring by using optical fiber sensing is disclosed in PTL 1. In a road monitoring system in PTL 1, an optical fiber cable laid along a road is used as a sensing medium for detecting a vibration caused by vehicle traveling. This allows the road monitoring system in PTL 1 to monitor a passing status of a vehicle passing through the road.

CITATION LIST

Patent Literature

PTL 1: International Patent Publication No. WO2020/116030

SUMMARY OF INVENTION

Technical Problem

In an optical fiber cable laid along a road, how a vibration is transmitted to the optical fiber cable varies depending on "a method of laying the optical fiber cable in a conduit, a rack, or the like, a speed or a weight of a vehicle traveling on the road, or the like" (hereinafter, referred to as a "laying status"). For example, when a truck is traveling, a large vibration is generated due to a heavy weight thereof. Thus, the vibration may be measured not only around the vehicle but also over a wide area. In optical fiber sensing, a traveling track of a vehicle is extracted from measured vibration information, and traffic information such as a traveling speed is calculated from the traveling track. However, in the technique disclosed in PTL 1, when a vibration of a vehicle during traveling is measured over a relatively wide area, a traveling track becomes unclear and is not extracted well, resulting in a problem that accurate traffic information cannot be calculated.

The present disclosure has been made in view of the above-described problem, and a main object of the present disclosure is to improve precision in calculating a vehicle speed.

Solution to Problem

In one aspect of the present disclosure, a road monitoring system includes: an optical fiber cable laid along a road; a reception means for receiving an optical signal from the optical fiber cable; a pattern extraction means for extracting, based on the received optical signal, a first pattern according to a traveling state of a vehicle on the road in a first time range and in a first distance range; a pattern transformation means for generating, based on the first pattern, a second pattern in which a number of time points included in the first time range or a number of positions included in the first distance range is decreased; and a calculation means for calculating a traveling speed of a vehicle on the road, based on the second pattern.

In one aspect of the present disclosure, a road monitoring device includes: a reception means for receiving an optical signal from an optical fiber cable laid along a road; a pattern extraction means for extracting, based on the received optical signal, a first pattern according to a traveling state of a vehicle on the road in a first time range and in a first distance range; a pattern transformation means for generating, based on the first pattern, a second pattern in which a number of time points included in the first time range or a number of positions included in the first distance range is decreased; and a calculation means for calculating a traveling speed of a vehicle on the road, based on the second pattern.

In one aspect of the present disclosure, a road monitoring method includes: extracting, based on an optical signal received from an optical fiber cable laid along a road, a first pattern according to a traveling state of a vehicle on the road in a first time range and in a first distance range; generating, based on the first pattern, a second pattern in which a number of time points included in the first time range or a number of positions included in the first distance range is decreased; and calculating a traveling speed of a vehicle on the road, based on the second pattern.

In one aspect of the present disclosure, a non-transitory computer-readable medium stores a road monitoring program causing a computer included in a road monitoring device to execute: processing of extracting, based on an optical signal received from an optical fiber cable laid along a road, a first pattern according to a traveling state of a vehicle on the road in a first time range and in a first distance range; processing of generating, based on the first pattern, a second pattern in which a number of time points included in the first time range or a number of positions included in the first distance range is decreased; and processing of calculating a traveling speed of a vehicle on the road, based on the second pattern.

Advantageous Effects of Invention

The present disclosure has an advantageous effect that precision in calculating a vehicle speed can be improved.

EXAMPLE EMBODIMENT

Hereinafter, example embodiments of the present disclosure will be described in detail with reference to the drawings. Note that, a similar component is assigned with a similar reference sign throughout all the drawings, and description therefor will be omitted as appropriate.

First Example Embodiment

A first example embodiment of the present disclosure, which is basic to each of the example embodiments of the present disclosure, will be described.
[Description of Configuration]

Figure 1:
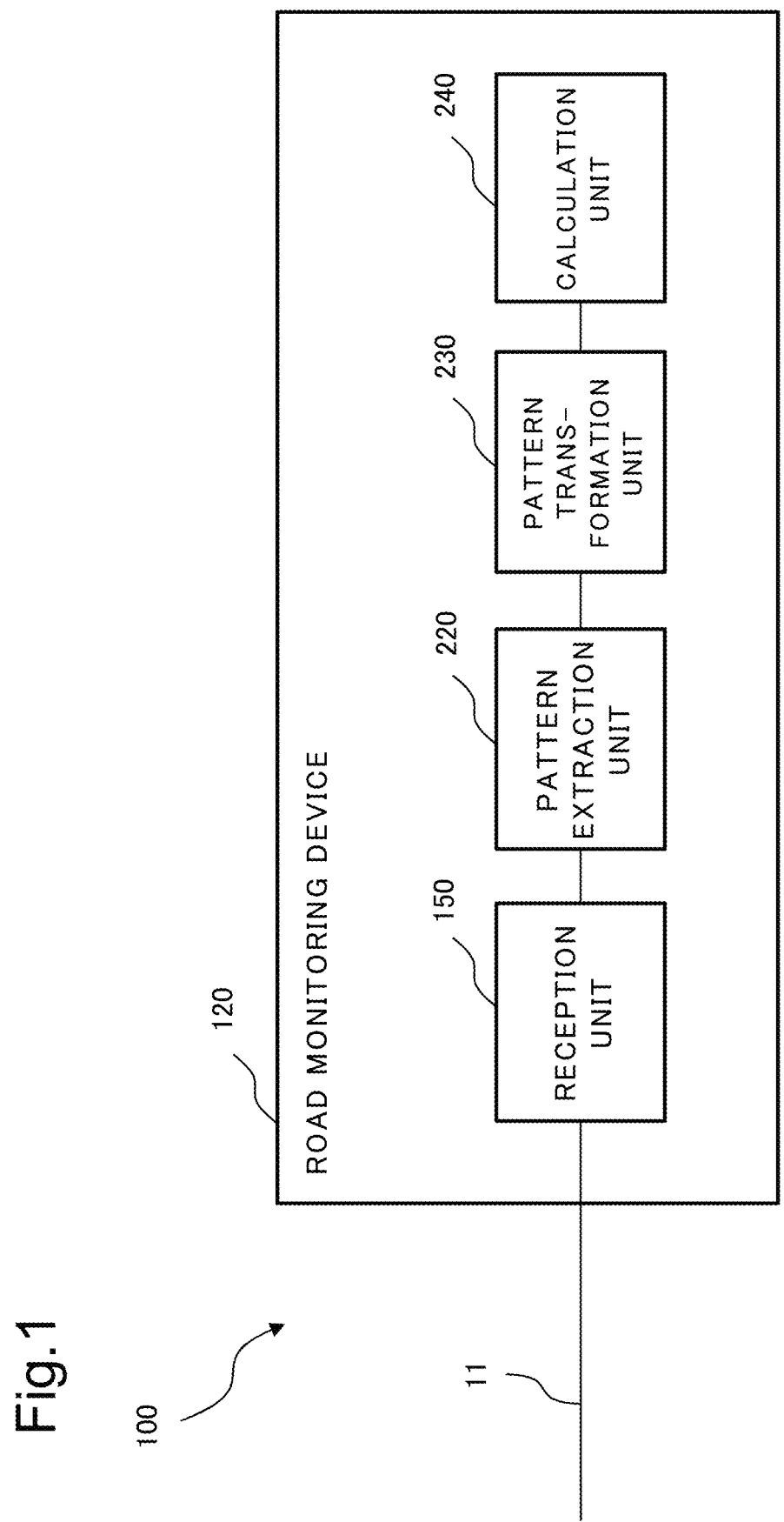
FIG. 1 is a block diagram illustrating one example of a configuration of a road monitoring system according to a first example embodiment of the present disclosure.

FIG. 1 is a block diagram illustrating one example of a configuration of a road monitoring system according to the first example embodiment of the present disclosure, as illustrated in FIG. 1, a road monitoring system (100) according to the present example embodiment includes an optical fiber cable (11) and a road monitoring device (120).

The optical fiber cable (11) is an optical fiber cable for communication, and is laid along a road.

The road monitoring device (120) includes a reception unit (150), a pattern extraction unit (220), a pattern transformation unit (230), and a calculation unit (240).

The reception unit (150) receives an optical signal from the optical fiber cable (11). Herein, the optical signal received by the reception unit (150) is a time series of detected values (hereinafter, referred to as "environmental fluctuation amounts") detected in the optical fiber cable (11). The environmental fluctuation amount varies according to a vibration generated in an environment in which the optical fiber cable (11) is laid. The environmental fluctuation amount is, for example, backscattered light of a signal being transmitted to the optical fiber cable (11). It is assumed that a time series of environmental fluctuation amounts is an overlay of pulses attributable to vibrations generated individually at positions in a longitudinal direction of the optical fiber cable (11), and that a time width of a pulse is sufficiently short compared with a time width required for propagation of the pulse and the pulse is sufficiently coarse. In this case, since a pulse is propagated at a constant speed, timing at which each pulse is detected can be associated with a generation position of each pulse in the optical fiber cable (11). A vibration of a road is generated upon passage of a vehicle through a particular position on the road, and, due to the vibration of the road, a pulse with the environmental fluctuation amount is generated in the optical fiber cable (11) laid along the road.

The pattern extraction unit (220) extracts, based on the received optical signal, a first pattern according to a traveling state of a vehicle on the road in a first time range and in a first distance range. Herein, the first pattern is a time series of environmental fluctuation amounts in which each environmental fluctuation amount is associated with a generation position thereof.

The pattern transformation unit (230) generates, based on the first pattern, a second pattern in which a number of time points included in the first time range or a number of positions included in the first distance range is decreased.

Herein, a "distance range" is a range of distance in a longitudinal direction of the optical fiber cable (11). A "number of positions" is the number of units of distance included in a certain "distance range". The number of "units of distance" is determined when timing at which each pulse is detected is associated with a generation position of each pulse in the optical fiber cable (11), which has been described above. For example, a case in which a "distance range" is the first distance range will be described. In this case, when the first distance range has a width of 1 kilometer and a "unit of distance" in a longitudinal direction of the optical fiber cable (11) is 10 meters, a number of positions included in the first distance range is 1000/10=100, that is, 100.

Further, a "time range" is a range of time in which a set of time series of environmental fluctuation amounts is detected. A "number of time points" is the number of detection cycles between time series included in a certain "time range". For example, a case in which a "time range" is the first time range will be described. In this case, when the first time range has a width of 10 minutes and a detection cycle between time series is 1 minute, a number of time points included in the first time range is 10/1=10, that is, 10.

Further, the second pattern is a time series of environmental fluctuation amounts in which each environmental fluctuation amount is associated with a generation position thereof, similarly to the first pattern. However, the number of environmental fluctuation amounts (a number of positions and a number of time points) included in a time series of environmental fluctuation amounts is different.

The calculation unit (240) calculates a traveling speed of a vehicle on the road, based on the second pattern. Herein, the calculation unit (240) detects a temporal change in a generation position of a vibration (that is, vehicle traveling) in the optical fiber cable (11), by continuously detecting a time series of environmental fluctuation amounts. The calculation unit (240) calculates a traveling speed of a vehicle, based on, for example, a traveling track of the vehicle in the second pattern. The calculation unit (240) calculates a traveling speed of a vehicle, for example, by linearly approximating a traveling track.

[Description of Operation]

Figure 2:
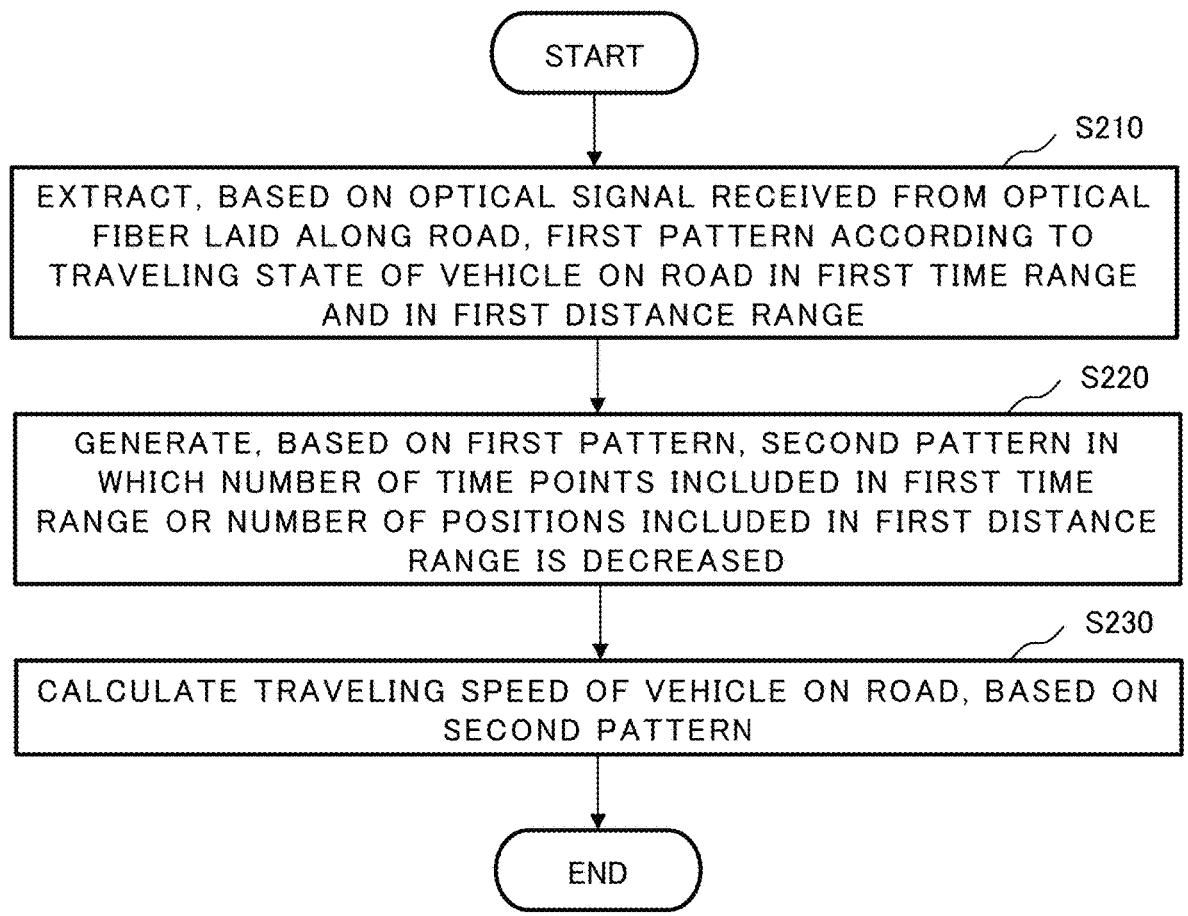
FIG. 2 is a flowchart illustrating an operation according to the first example embodiment of the present disclosure.

FIG. 2 is a flowchart illustrating an operation according to the first example embodiment of the present disclosure.

First, the pattern extraction unit (220) extracts, based on a received optical signal, a first pattern according to a traveling state of a vehicle on a road in a first time range and in a first distance range (Step S210).

Then, the pattern transformation unit (230) generates, based on the first pattern, a second pattern in which a number of time points included in the first time range or a number of positions included in the first distance range is decreased (Step S220).

Then, the calculation unit (240) calculates a traveling speed of a vehicle on the road, based on the second pattern (Step S230).

[Description of Advantageous Effect]

As described above, in the road monitoring device (120) according to the present example embodiment, the pattern extraction unit (220) extracts, based on a received optical signal, a first pattern according to a traveling state of a vehicle on a road in a first time range and in a first distance range. Then, the pattern transformation unit (230) generates, based on the first pattern, a second pattern in which a number of time points included in the first time range or a number of positions included in the first distance range is decreased. Herein, a vehicle traveling track in the second pattern is thinner in width than a vehicle traveling track in the first pattern. The calculation unit (240) calculates a traveling speed of a vehicle on the road, based on the second pattern in which a traveling track of the vehicle is thinner in width than that in the first pattern, more accurately than in a case based on the first pattern. Accordingly, the road monitoring device (120) according to the present example embodiment has an advantageous effect that precision in calculating a vehicle speed can be improved.

Note that, the pattern transformation unit (230) may determine the number of time points included in the first time range or the number of positions included in the first distance range in such a way that the traveling track of the vehicle in the second pattern does not disappear. In this case, the road monitoring device (120) according to the present example embodiment has an advantageous effect that failure in calculating a vehicle speed can be prevented.

Further, the optical signal in a second time range included in the first time range or a second distance range included in the first distance range may be zero. In this case, the road monitoring device (120) according to the present example embodiment has an advantageous effect that computational amount or storage capacity can be reduced.

Second Example Embodiment

A second example embodiment of the present disclosure, which is based on the first example embodiment of the present disclosure, will be described.

[Description of Configuration]

Figure 3:
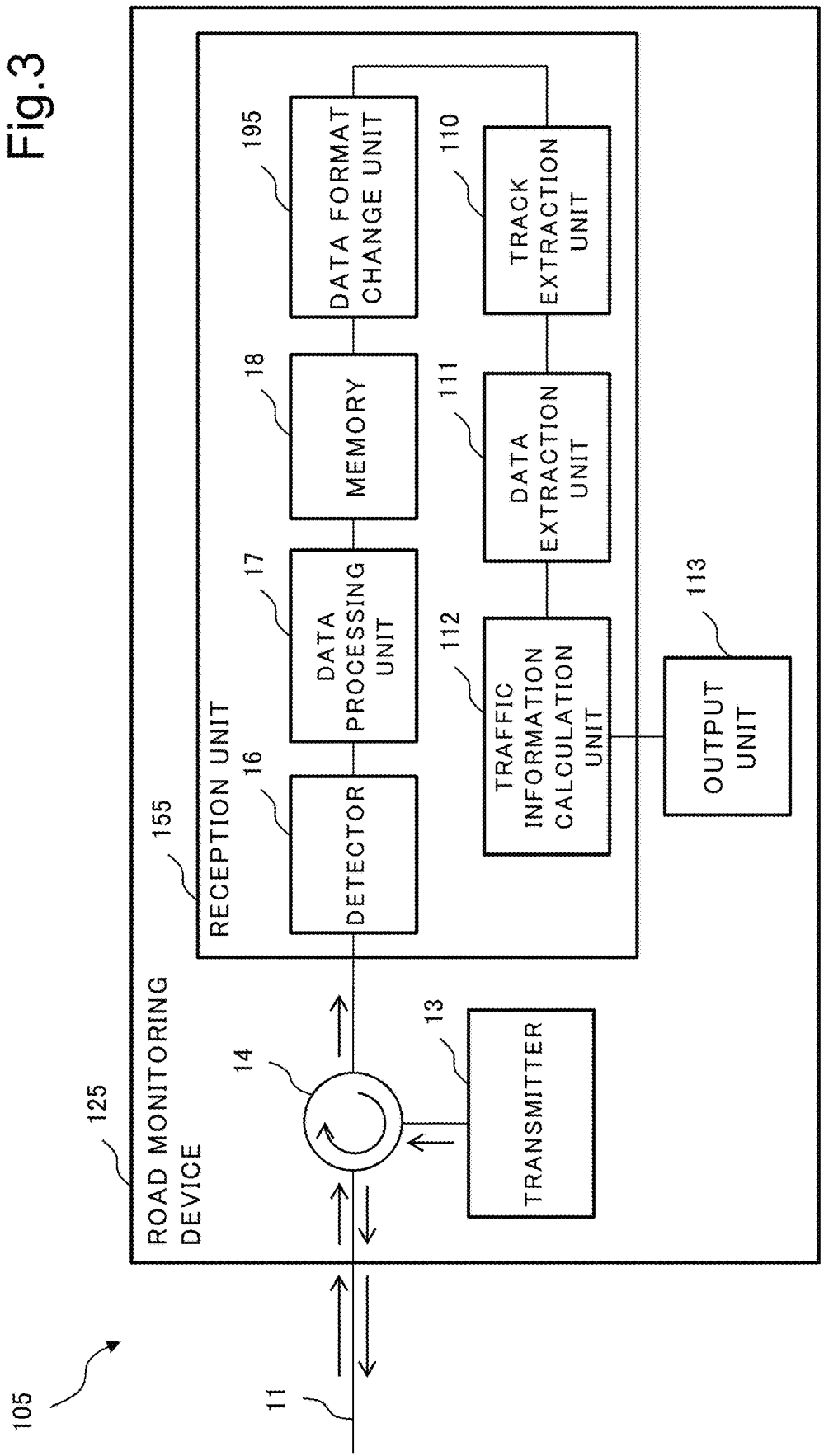
FIG. 3 is a block diagram illustrating one example of a configuration of a road monitoring system according to a second example embodiment of the present disclosure.

FIG. 3 is a block diagram illustrating one example of a configuration of a road monitoring system according to the second example embodiment of the present disclosure. A road monitoring system (105) according to the present example embodiment acquires a time series of detected values (environmental fluctuation amounts) that vary according to a vibration generated in an environment in which the optical fiber cable (11) is laid and are detected in an optical fiber cable (11). Herein, the environmental fluctuation amount is magnitude of backscattered light of a transmission signal in the optical fiber cable (11). In the present example embodiment, a vibration of a road is generated upon passage of a vehicle through a particular position on the road, and, due to the vibration of the road, a pulse with the environmental fluctuation amount is generated in the optical fiber cable (11) laid along the road. Then, the road monitoring system (105) detects a temporal change in a generation position of a vibration (that is, vehicle traveling) in the optical fiber cable (11), by continuously detecting a time series of environmental fluctuation amounts. Then, the road monitoring system (105) calculates, based on the time series of environmental fluctuation amounts, traffic information including a traveling speed of a vehicle. The traffic information may further include information such as an inter-vehicle spacing, a vehicle acceleration, the number of vehicles, or a vehicle traveling direction. The road monitoring system (105) includes the optical fiber cable (11) and a road monitoring device (125).

The road monitoring device (125) includes a transmitter (13), a circulator (14), a reception unit (155), and an output unit (113).

The transmitter (13) transmits an optical pulse to the circulator (14) through an optical path.

The circulator (14) outputs the optical pulse transmitted from the transmitter (13), to the optical fiber cable (11), and outputs backscattered light of the optical pulse returning from the optical fiber cable (11), to the reception unit (155) through an optical path.

The reception unit (155) calculates traffic information, based on the backscattered light received from the circulator (14), and outputs the calculated traffic information to the output unit (113).

The output unit (113) outputs the traffic information to outside.

The reception unit (155) includes a detector (16), a data processing unit (17), a memory (18), a data format change unit (195) (one example of a pattern extraction unit and a pattern transformation unit), a track extraction unit (110) (one example of a calculation unit), a data extraction unit (111) (one example of a calculation unit), and a traffic information calculation unit (112). The detector (16) converts backscattered light of a received optical pulse into an electrical signal, and outputs the converted electrical signal to the data processing unit (17).

The data processing unit (17) acquires an environmental fluctuation amount by converting the input electrical signal being analog data into digital data, and outputs the environmental fluctuation amount to the memory (18).

The memory (18) accumulates data representing a time series of environmental fluctuation amounts (environmental fluctuation amount data) for a predetermined period of time in a format capable of calculating a generation position of each environmental fluctuation amount.

The data format change unit (195) determines a range of distance and time for which traffic information is to be calculated (a traffic information calculation range). Further, the data format change unit (195) derives a range of environmental fluctuation amount data associated with a range of distance and time (a track extraction range) used to extract a traveling track of a vehicle. The track extraction range is an extension of the traffic information calculation range in distance and time directions. Further, the data format change unit (195) copies the environmental fluctuation amount data in the derived range, into a storage area for the track extraction range on the memory (18). Further, the data format change unit (195) shrinks the copied environmental fluctuation amount data in such a way that the track extraction range has a distance width and a time width each being the same as before extension.

The track extraction unit (110) extracts a traveling track, based on the environmental fluctuation amount data stored in the storage area for the track extraction range.

The data extraction unit (111) calculates a traveling speed of a vehicle, based on data representing the extracted traveling track.

The traffic information calculation unit (112) generates traffic information, based on the traveling speed of the vehicle, the traveling track of the vehicle, or the like.

[Description of Operation]

Figure 4:
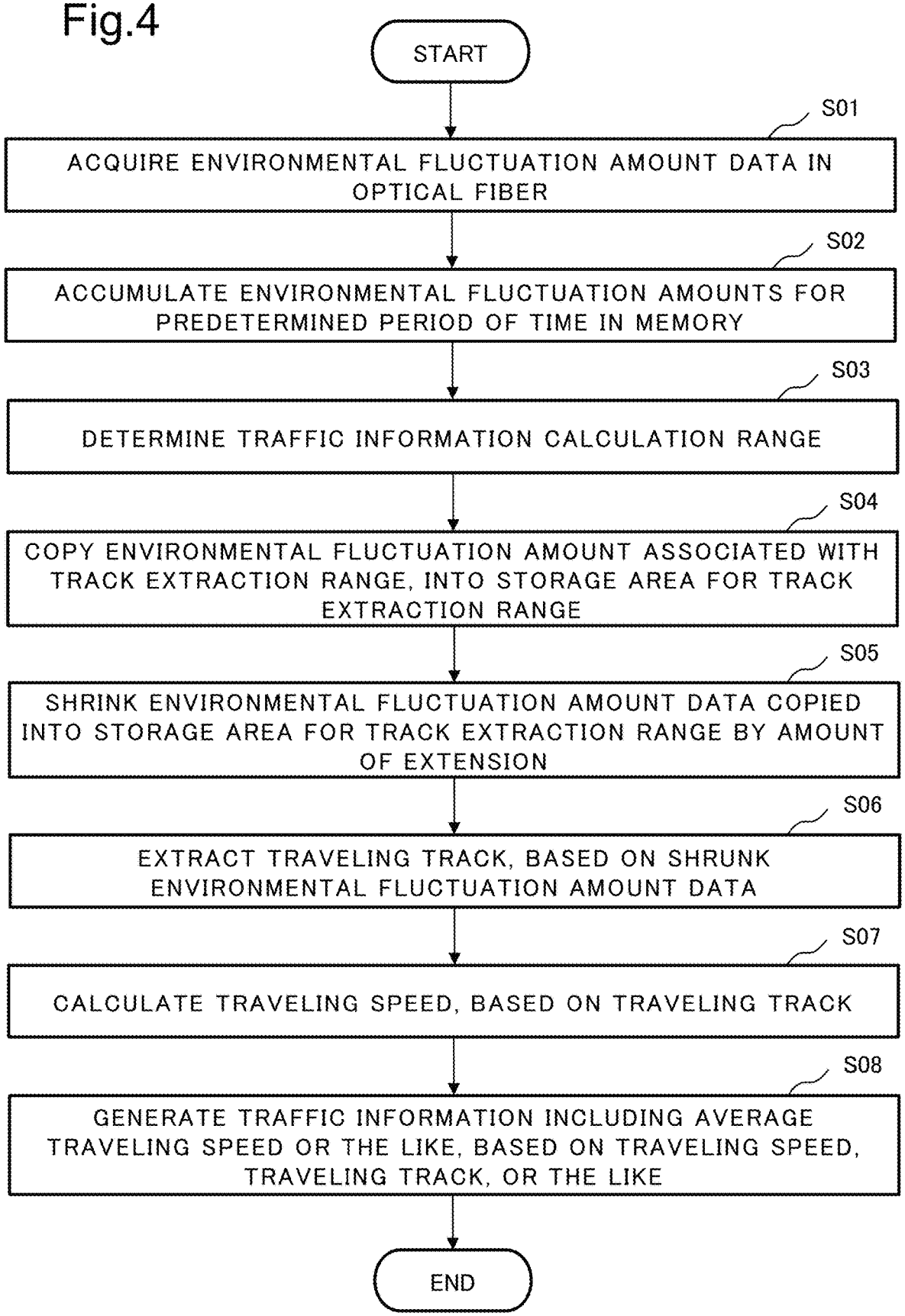
FIG. 4 is a flowchart illustrating an operation according to the second example embodiment of the present disclosure.

An operation of the road monitoring system (105) will be described with reference to FIGS. 3 and 4. FIG. 4 is a flowchart illustrating an operation according to the second example embodiment of the present disclosure.

First, the data processing unit (17) acquires a time series of environmental fluctuation amounts that fluctuate due to a vibration applied to the optical fiber cable (11) by vehicle traveling (Step S01). Herein, timing at which each environmental fluctuation amount is detected can be associated with a generation position of each environmental fluctuation amount in the optical fiber cable (11), based on a difference in time required from transmission of an optical pulse to reception of backscattered light. In view of this, the data processing unit (17) associates, for example, information on time when an optical pulse is transmitted with an environmental fluctuation amount when the optical pulse is transmitted, thereby enabling calculation of a generation position of each environmental fluctuation amount.

Next, the memory (18) accumulates acquired environmental fluctuation amount data for a predetermined period of time in a format capable of calculating a generation position of each environmental fluctuation amount (Step S02). The memory (18) accumulates, for example, environmental fluctuation amount data in which information on time when an optical pulse is transmitted is associated with an environmental fluctuation amount when the optical pulse is transmitted.

Then, the data format change unit (195) determines a traffic information calculation range (Step S03). The data format change unit (195) determines a traffic information calculation range, based on, for example, a setting held by the road monitoring device (125).

Then, the data format change unit (195) derives a range of environmental fluctuation amount data associated with a track extraction range. Then, the data format change unit (195) copies the environmental fluctuation amount data in the derived range, into a storage area for the track extraction range on the memory (18) (Step S04). Herein, the track extraction range is a range that includes the traffic information calculation range and is wider than the traffic information calculation range.

Then, the data format change unit (195) shrinks the copied environmental fluctuation amount data in such a way that the track extraction range has a distance width and a time width each being the same as before extension (Step S05). Herein, the traffic information calculation range is, for example, a range of 1 kilometer (km) and 1 minute in a case of calculating traffic information including an average vehicle speed for 1 km×1 minute, and is a range of 2 km and 2 minutes in a case of calculating traffic information for 2 km×2 minutes. For example, when the track extraction range has a distance width and a time width each extended twice as long as the traffic information calculation range, the environmental fluctuation amount data included in the storage area for the track extraction range are thinned in half for each of distance and time directions. More specifically, for example, the environmental fluctuation amount data associated with an odd-numbered distance and an odd-numbered time are deleted.

Then, the track extraction unit (110) extracts a traveling track, based on the environmental fluctuation amount data stored in the storage area for the track extraction range (Step S06). The track extraction unit (110) extracts a traveling track, for example, by linearly approximating, using a least squares method, a band of values (high values) greater than a predetermined threshold value, in the environmental fluctuation amount data distributed on a plane with distance and time as axes.

Then, the data extraction unit (111) calculates a vehicle traveling speed, based on data representing the extracted traveling track (Step S07). The data extraction unit (111) calculates a vehicle traveling speed, for example, based on a slope of the above-described approximate straight line.

Then, the traffic information calculation unit (112) generates traffic information including, for example, a vehicle average speed or the like, based on the vehicle traveling speed calculated in Step S07, the vehicle traveling track extracted in Step S06, or the like (Step S08).

[Description of Advantageous Effect]

Figure 5:
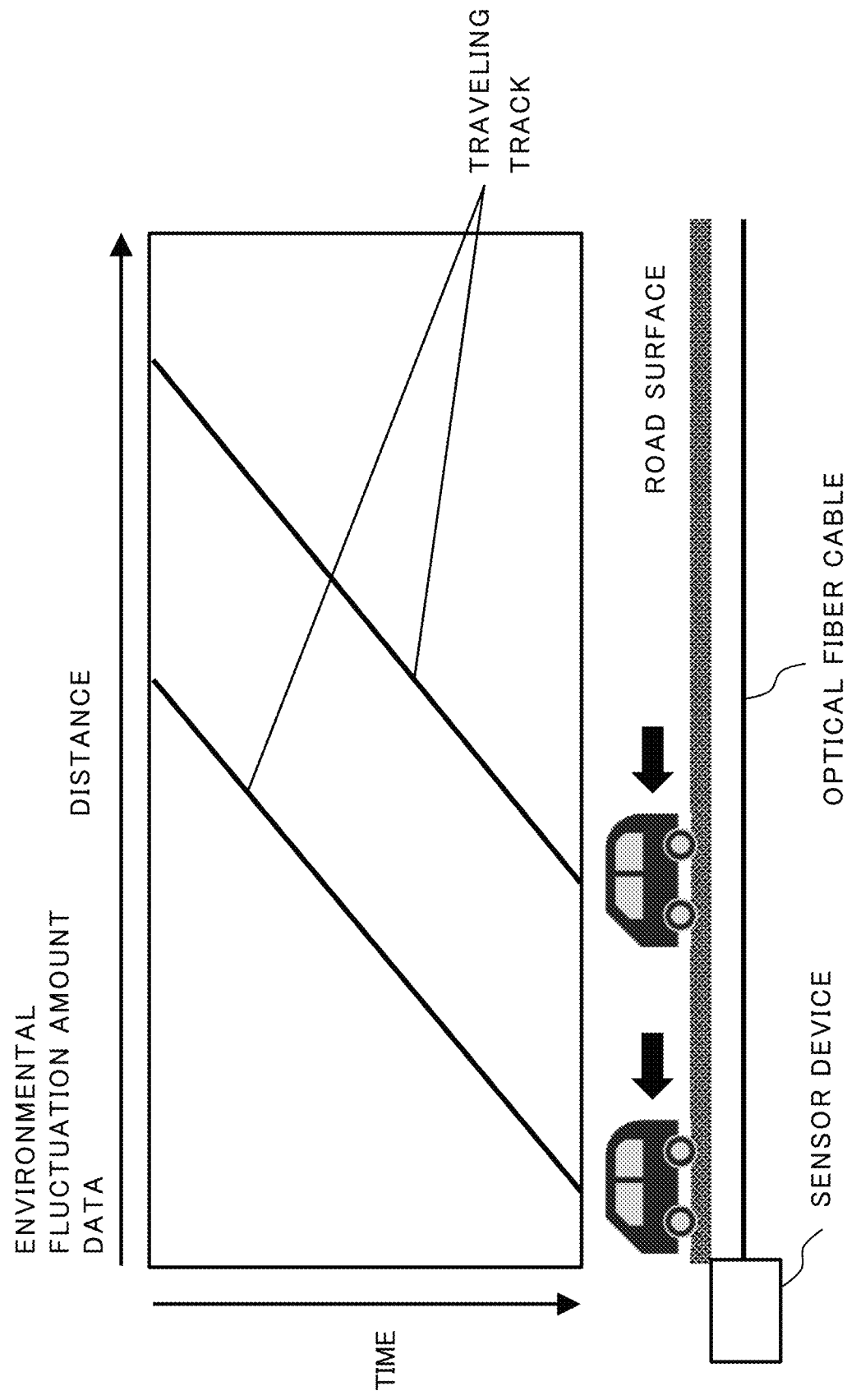
FIG. 5 is a schematic diagram illustrating one example of a traveling track when an environmental fluctuation amount generated by a vehicle traveling along a road is measured by an optical fiber sensor.
Figure 6:
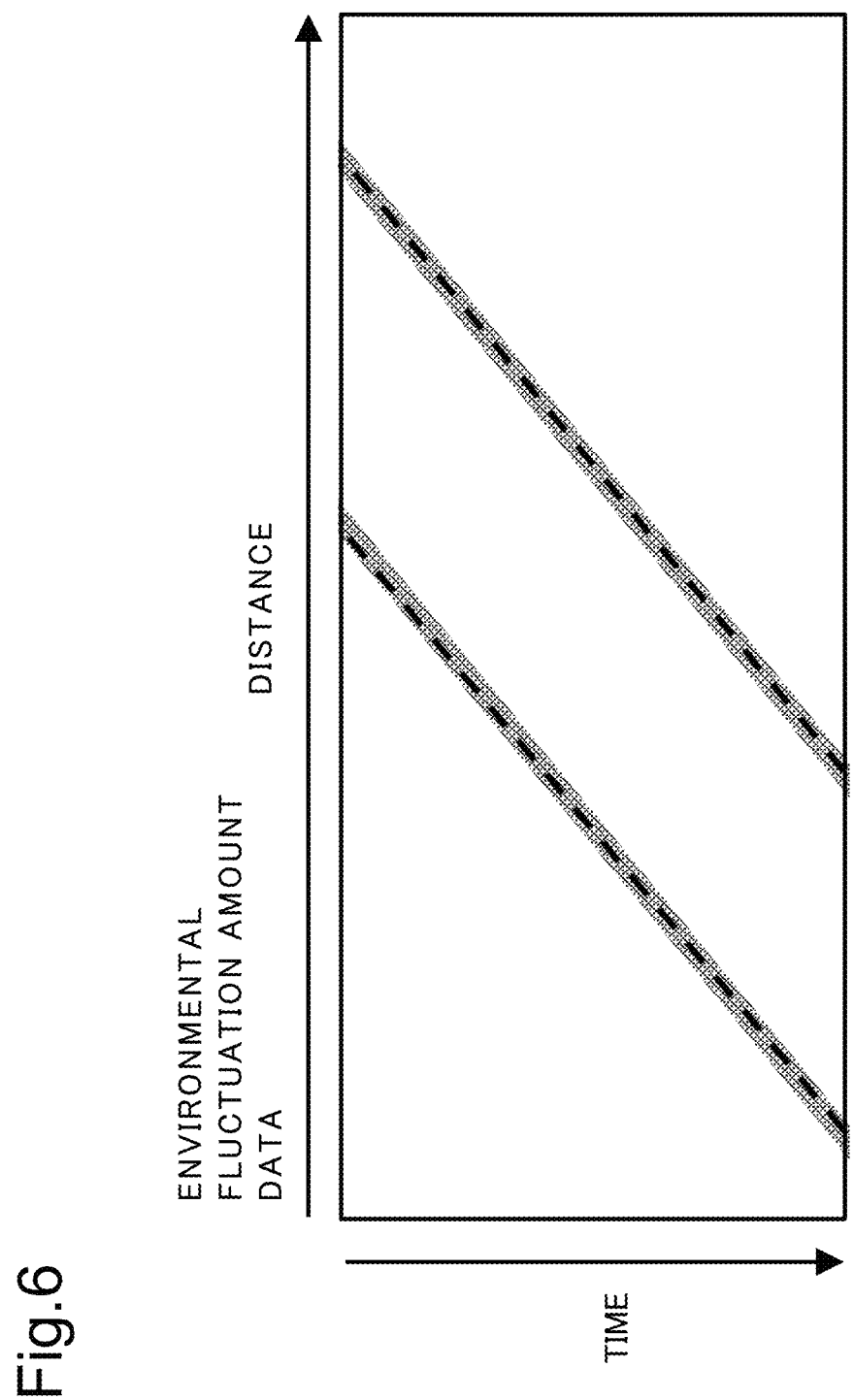
FIG. 6 is a schematic diagram illustrating one example of an ideal traveling track.
Figure 7:
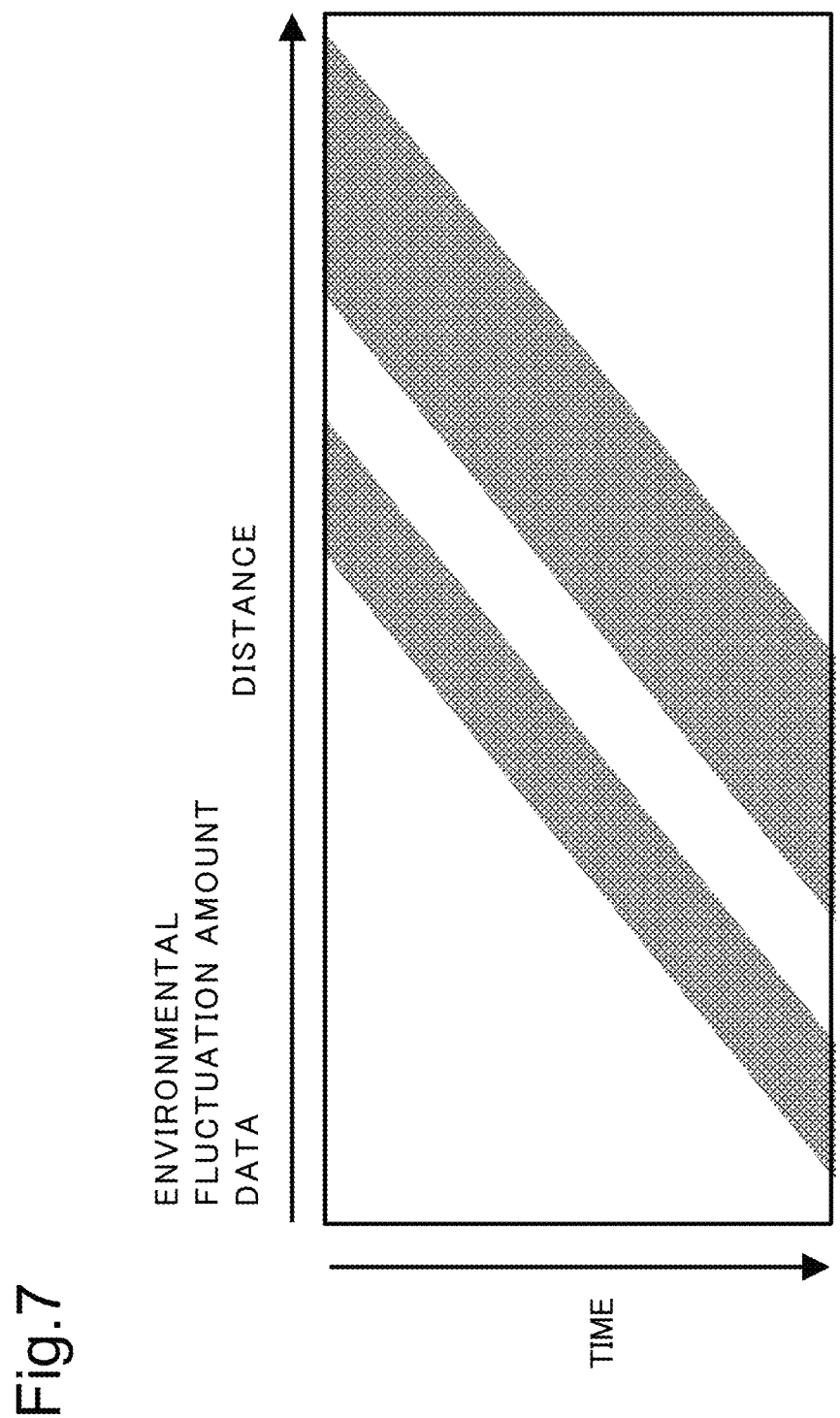
FIG. 7 is a schematic diagram illustrating one example of an unclear traveling track.
Figure 8:
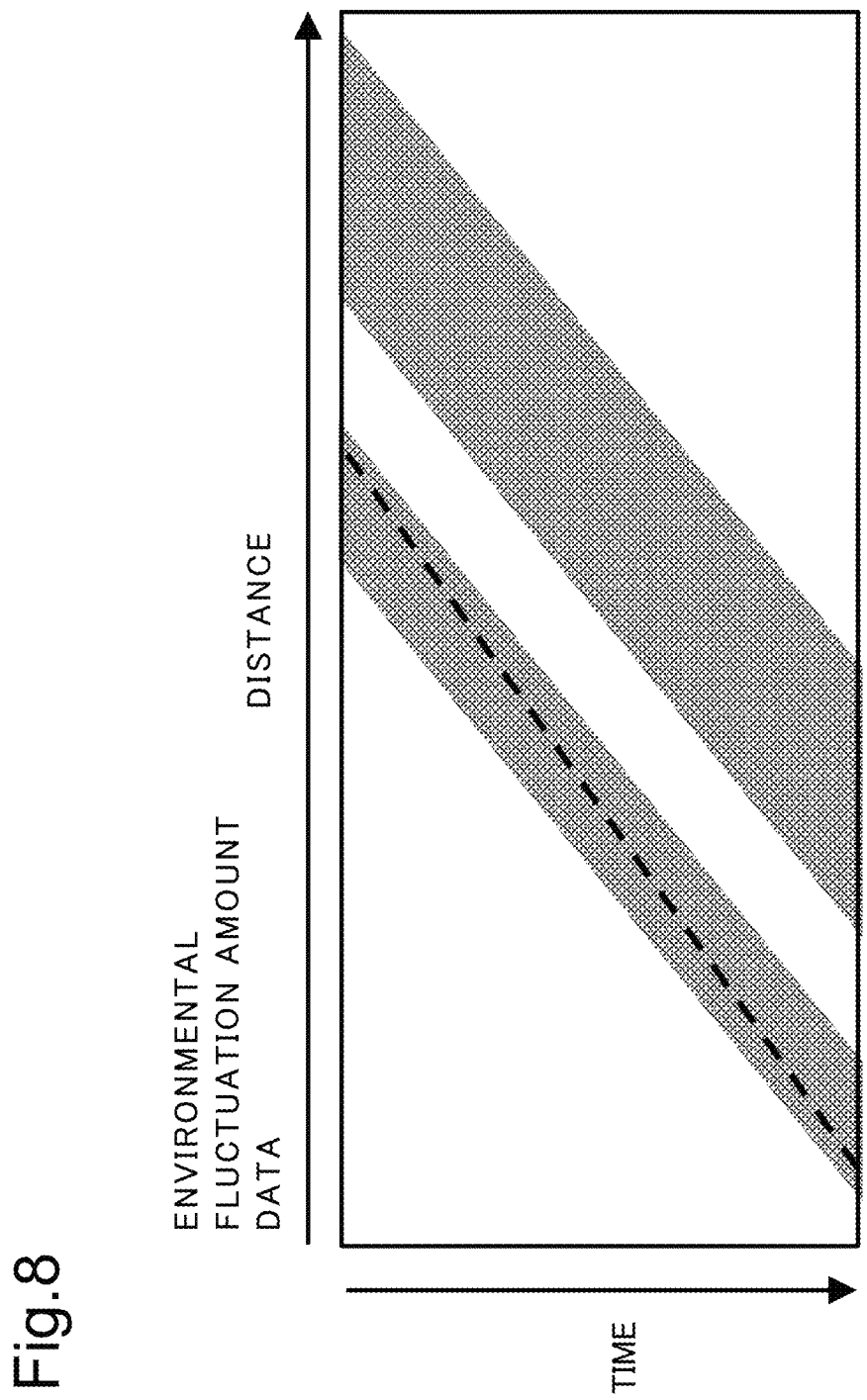
FIG. 8 is a schematic diagram illustrating one example that a traveling track with a wrong slope is extracted from an unclear traveling track.
Figure 9:
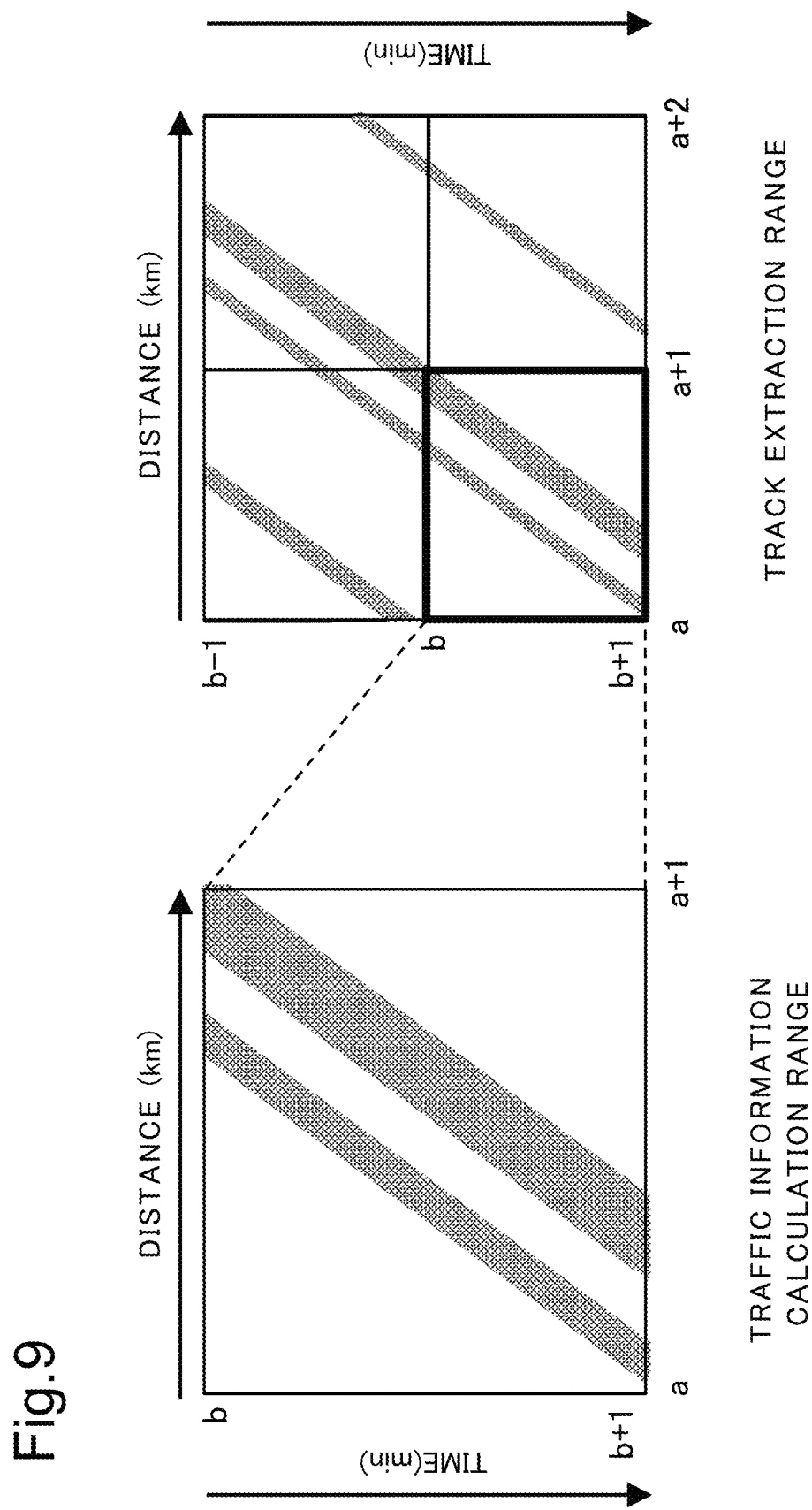
FIG. 9 is a schematic diagram illustrating an operation of clarifying an unclear traveling track.

Next, an advantageous effect of the present example embodiment will be described with reference to FIGS. 5 to 9. In FIGS. 5 to 9, a vertical axis of a graph represents time, and a horizontal axis of a graph represents distance. In the graphs in FIGS. 5 to 9, a solid line represents a vehicle traveling track, a shaded band represents high values of an environmental fluctuation amount, and a dashed line represents a vehicle traveling track extracted from an environmental fluctuation amount. FIG. 5 is a schematic diagram illustrating one example of a traveling track when an environmental fluctuation amount generated by a vehicle traveling along a road is measured by an optical fiber sensor. FIG. 6 is a schematic diagram illustrating one example of an ideal traveling track. FIG. 7 is a schematic diagram illustrating one example of an unclear traveling track. FIG. 8 is a schematic diagram illustrating one example that a traveling track with a wrong slope is extracted from an unclear traveling track. FIG. 9 is a schematic diagram illustrating an operation of clarifying an unclear traveling track.

First, a general road monitoring technique will be described. It is assumed that a vehicle travels along an optical fiber cable, as illustrated in FIG. 5. In this case, ideally, a traveling track is extracted with a position and a slope matching high values of environmental fluctuation amount data, as illustrated by a dashed line in FIG. 6. However, as illustrated in FIG. 7, broadened environmental fluctuation amount data may be acquired depending on a laying status of the optical fiber cable, resulting in an unclear traveling track. In such a situation, as illustrated by a dashed line in FIG. 8, a traveling track may be extracted with a slope different from environmental fluctuation amount data, and wrong traffic information may be calculated.

Meanwhile, in the present example embodiment, a traffic information calculation range is extended in each of distance and time, a copy of environmental fluctuation amount data in the extended range is shrunk in such a way as to have a size being the same as before extension, and thereby a traveling track is extracted, as illustrated in FIG. 9. Thereby, even when an environmental fluctuation amount indicating a high value is broadened and unclear, a traveling track is shrunk in width and clarified. Consequently, the present example embodiment has an advantageous effect that a traveling track with a correct slope can be extracted from environmental fluctuation amount data, and precision in calculating traffic information including information relevant to a vehicle speed can be improved.

Note that, a content of the present example embodiment is not limited to the above-described description.

In the above-described description, an example has been indicated in which environmental fluctuation amount data included in a traffic information calculation range are extended in both of distance and time directions, and are shrunk in such a way as to have a size being the same as before extension. However, in the present example embodiment, environmental fluctuation amount data included in a traffic information calculation range may be extended in only a distance direction or only a time direction, and may be shrunk in only an extended direction. In this case, the present example embodiment has an advantageous effect that computational amount can be reduced.

Further, in the above-described description, an example has been indicated in which the traffic information calculation unit (112) generates traffic information including an average speed or the like, based on a traveling track in Step S07, but the traffic information calculation unit (112) may output a traveling track without generating traffic information. In this case, the present example embodiment has an advantageous effect that a traveling status of an individual vehicle can be monitored.

Third Example Embodiment

A third example embodiment of the present disclosure, which is based on the second example embodiment of the present disclosure, will be described.

[Description of Configuration]

Figure 10:
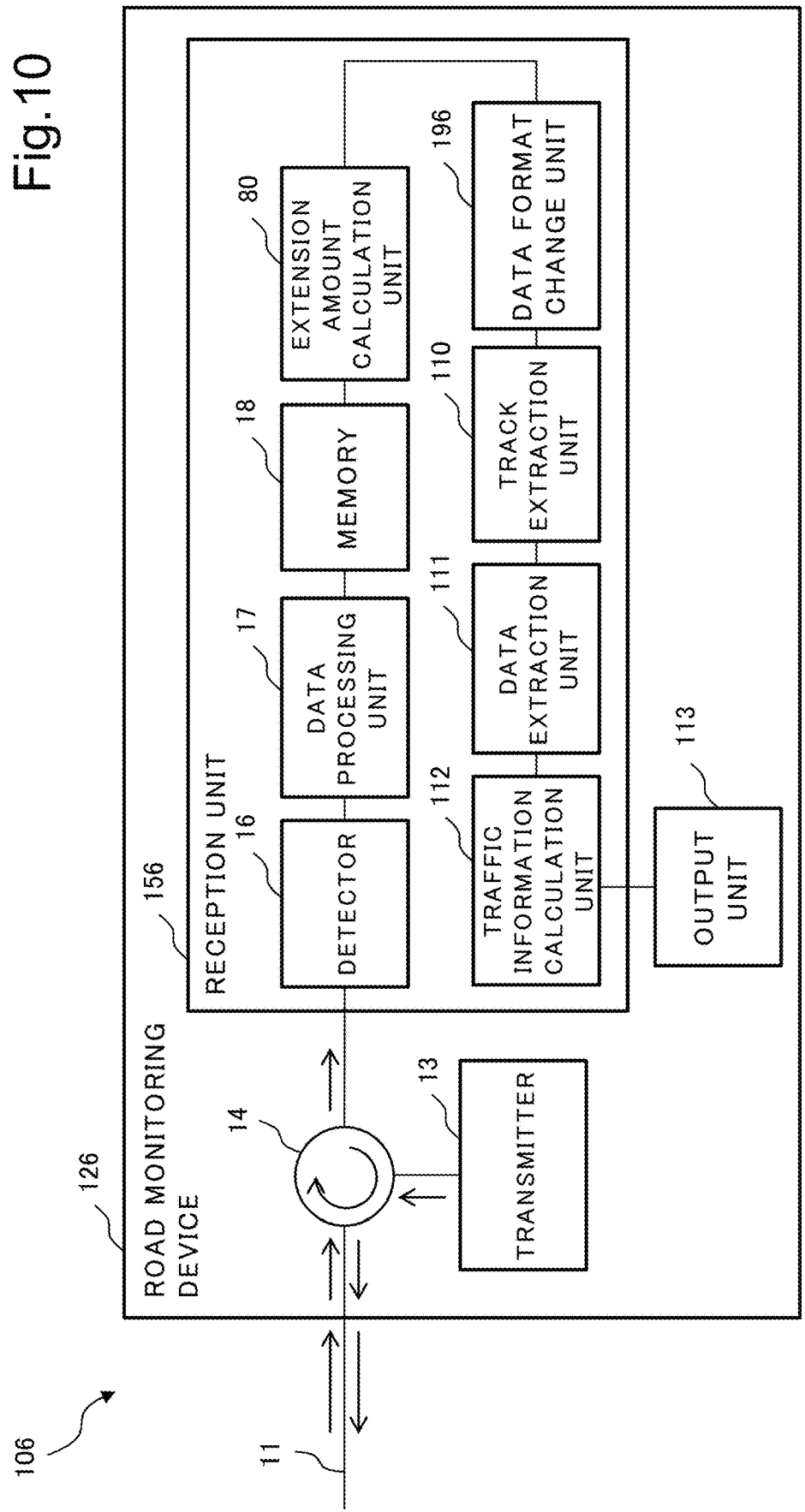
FIG. 10 is a block diagram illustrating one example of a configuration of a road monitoring system according to a third example embodiment of the present disclosure.

FIG. 10 is a block diagram illustrating one example of a configuration of a road monitoring system according to the third example embodiment of the present disclosure. A road monitoring system (106) according to the present example embodiment acquires a time series of environmental fluctuation amounts in an optical fiber cable (11). The road monitoring system (106) includes the optical fiber cable (11) and a road monitoring device (126).

The road monitoring device (126) includes a transmitter (13), a circulator (14), a reception unit (156), and an output unit (113).

The reception unit (156) includes a detector (16), a data processing unit (17), a memory (18), an extension amount calculation unit (80) (one example of a pattern transformation unit), a data format change unit (196) (one example of a pattern extraction unit and a pattern transformation unit), a track extraction unit (110) (one example of a calculation unit), a data extraction unit (111) (one example of a calculation unit), and a traffic information calculation unit (112).

The extension amount calculation unit (80) extracts a number of positions or a number of time points (referred to as a "track distance width" or a "track time width", respectively) included in a traveling track in environmental fluctuation amount data accumulated in the memory (18). The track distance width or the track time width indicates high values of the environmental fluctuation amount data consecutively lined in each distance or time direction. Then, the extension amount calculation unit (80) acquires a minimum track distance width and a minimum track time width. Then, the extension amount calculation unit (80) determines a value of the smaller of the minimum track distance width and the minimum track time width, as an extension scale factor. Herein, the extension scale factor is a scale factor for extending a distance width and a time width of a track extraction range relative to a traffic information calculation range. The extension scale factor is used for determining a track extraction range in Step S09 (equivalent to Step S04 in the first example embodiment) to be described later. In addition, the extension scale factor is determined to prevent loss of a traveling track as a result of shrinkage of a track extraction range in Step S05 (same as in the first example embodiment) to be described later, where a distance width and a time width of the traveling track after shrinkage become less than 1. However, in the present example embodiment, when the extension scale factor becomes 1, a track extraction range is not substantially extended and shrunk. In view of this, in the present example embodiment, it is assumed that the extension scale factor is equal to or more than 2. That is, in the present example embodiment, it is assumed that environmental fluctuation amount data having a resolution in distance and time directions such that the minimum track distance width and the minimum track time width are both equal to or more than 2 are available. Alternatively, in the present example embodiment, when the extension scale factor becomes 1, occurrence of an error may be displayed or the like to interrupt subsequent processing.

The data format change unit (196) determines a traffic information calculation range, and determines a track extraction range, based on the extension scale factor determined by the extension amount calculation unit (80). Then, the data format change unit (196) derives a range of environmental fluctuation amount data associated with the track extraction range, and copies the environmental fluctuation amount data in the derived range, into a storage area for the track extraction range on the memory (18).

Other configurations are the same as in the second example embodiment.

[Description of Operation]

Figure 11:
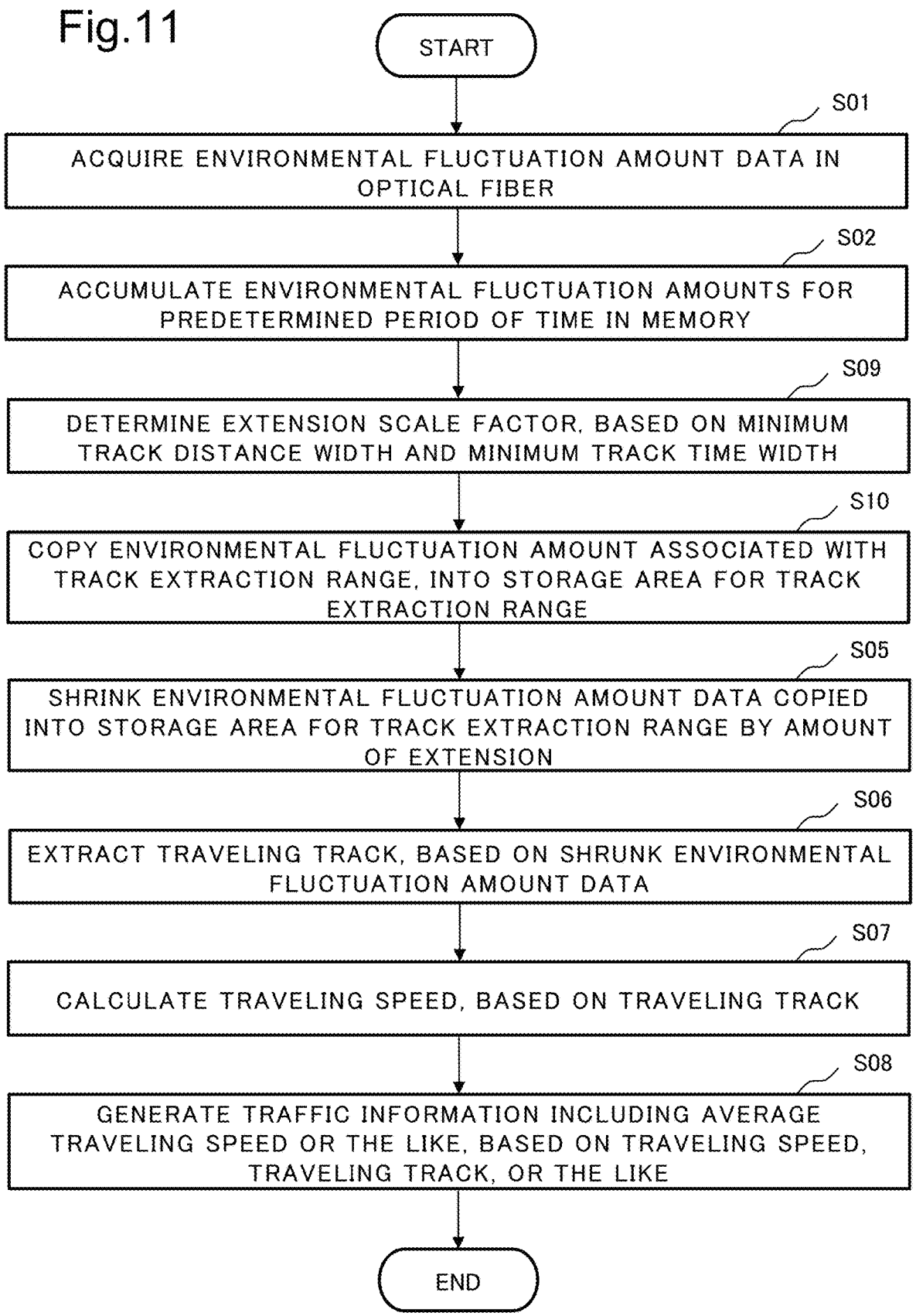
FIG. 11 is a flowchart illustrating an operation according to the third example embodiment of the present disclosure.

An operation of the road monitoring system (106) will be described with reference to FIGS. 10 and 11. FIG. 11 is a flowchart illustrating an operation according to the third example embodiment of the present disclosure.

Operations in Steps S01 and S02 are the same as in the second example embodiment.

Subsequently to Step S02, the extension amount calculation unit (80) extracts a track distance width and a track time width included in a traveling track in environmental fluctuation amount data that are accumulated in the memory (18) and are associated with a traffic information calculation range, and acquires a minimum track distance width and a minimum track time width. Then, the extension amount calculation unit (80) determines a value of the smaller of the minimum track distance width and the minimum track time width, as an extension scale factor of a track extraction range relative to the traffic information calculation range (Step S09). Herein, for example, when the extension scale factor is 2, the track extraction range has a distance width and a time width each extended twice as long as the traffic information calculation range.

Then, the data format change unit (196) determines a track extraction range, based on the extension scale factor determined in Step S09. Then, the data format change unit (196) derives a range of environmental fluctuation amount data associated with the track extraction range, copies the environmental fluctuation amount data in the derived range, into a storage area for the track extraction range on the memory (18) (Step S10), and proceeds to processing in Step S05.

Operations in Steps S05 to S08 are the same as in the second example embodiment.

Other operations are the same as in the second example embodiment.

[Description of Advantageous Effect]

Figure 12:
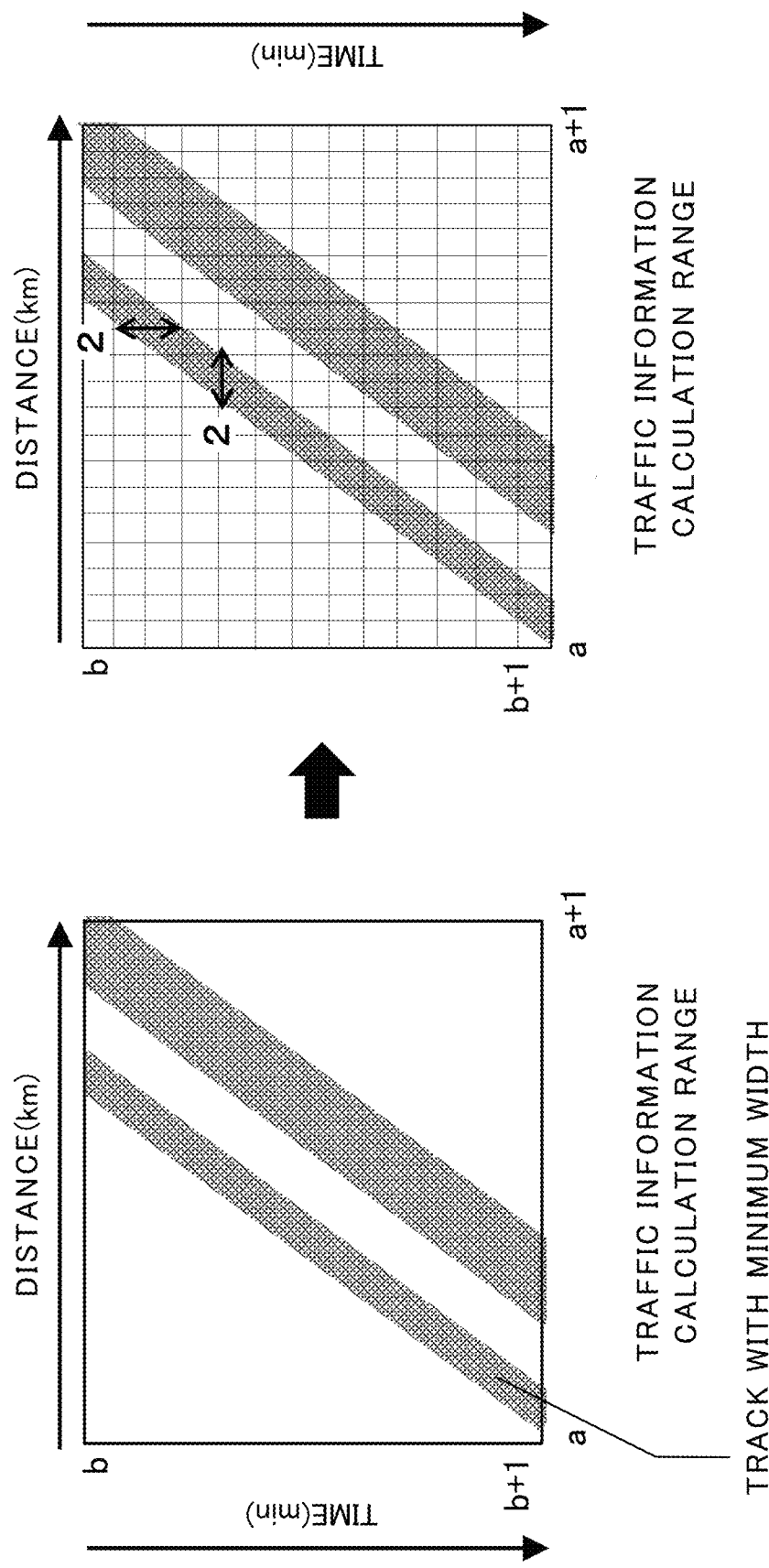
FIG. 12 is a schematic diagram illustrating one example of a data width in distance and time directions that a traveling track has.

Next, an advantageous effect of the present example embodiment will be described with reference to FIG. 12. FIG. 12 is a schematic diagram illustrating one example of a data width in distance and time directions that a traveling track has. In FIG. 12, a right-side part indicates that a traffic information calculation range indicated on a left side is divided into pieces of environmental fluctuation amount data. That is, each of regions divided in a grid shape indicates each piece of environmental fluctuation amount data.

In the present example embodiment, a minimum track distance width and a minimum track time width included in environmental fluctuation amount data are each acquired. Then, a value of the smaller thereof is determined as an extension scale factor, and a distance width and a time width of a traffic information calculation range are multiplied by the extension scale factor, thereby a distance width and a time width of a track extraction range are calculated. Then, the environmental fluctuation amount data are divided for distance and time to calculate traffic information, the divided data are extended in such a way as to have the distance width and the time width multiplied by the extension scale factor, and environmental fluctuation amount data of the track extraction range are calculated. Then, the environmental fluctuation amount data of the track extraction range are shrunk in such a way as to have a size being the same as before extension. Consequently, a vehicle traveling track with a broadened and unclear environmental fluctuation amount data can be shrunk in width and clarified without eliminating the traveling track through shrinking processing, and a track with a correct slope can be easily extracted from the environmental fluctuation amount data, environmental fluctuation amount data In the present example embodiment, a distance width and a time width included in environmental fluctuation amount data accumulated in the memory (18) are extracted, and a minimum track distance width and a minimum track time width are acquired, as illustrated in FIG. 12. Then, the extension amount calculation unit (80) determines a value of the smaller of the minimum track distance width and the minimum track time width, as an extension scale factor. In the example illustrated in FIG. 12, a left-side traveling track out of two traveling tracks is narrower in width, and a minimum track distance width and a minimum track time width thereof are both 2, which gives an extension scale factor of 2. When a traffic information calculation range has a width of 1 km×1 minute, a track extraction range has a distance width of 2 km and a time width of 2 minutes. Then, the traffic information calculation range is extended in each of distance and time, a copy of environmental fluctuation amount data in the extended range is shrunk in such a way as to have a size being the same as before extension, and thereafter a traveling track is extracted, as described with reference to FIG. 9 in the second example embodiment. Thereby, even when the traffic information calculation range has a broadened and unclear traveling track, a traveling track in a track extraction range after shrinkage is shrunk in width and clarified. Consequently, the present example embodiment has an advantageous effect that a traveling track with a correct slope can be extracted from environmental fluctuation amount data without losing the traveling track after shrinkage of a track extraction range, and precision in calculating traffic information including information relevant to a vehicle speed can be improved.

Note that, a content of the present example embodiment is not limited to the above-described description.

In the above-described description, an example has been indicated in which environmental fluctuation amount data included in a traffic information calculation range are extended in both of distance and time directions, and are shrunk in such a way as to have a size being the same as before extension. However, in the present example embodiment, environmental fluctuation amount data included in a traffic information calculation range are extended in only a distance direction or only a time direction, and are shrunk in only an extended direction. In this case, the present example embodiment has an advantageous effect that computational amount can be reduced.

Further, in the above-described description, an example has been indicated in which the traffic information calculation unit (112) generates traffic information including an average speed or the like, based on a traveling track in Step S07, but the traffic information calculation unit (112) may output a traveling track without generating traffic information. In this case, the present example embodiment has an advantageous effect that a traveling status of an individual vehicle can be monitored.

Further, in the above-described description, an example has been indicated in which an extension scale factor is calculated from a traveling track having a minimum track width of environmental fluctuation amount data in a traffic information calculation range, but an extension scale factor may be calculated from a traveling track having a minimum track width of all pieces of accumulated environmental fluctuation amount data. In this case, the present example embodiment has an advantageous effect that computational amount can be reduced.

Fourth Example Embodiment

A fourth example embodiment of the present disclosure, which is based on the second example embodiment of the present disclosure, will be described.

[Description of Configuration]

Figure 13:
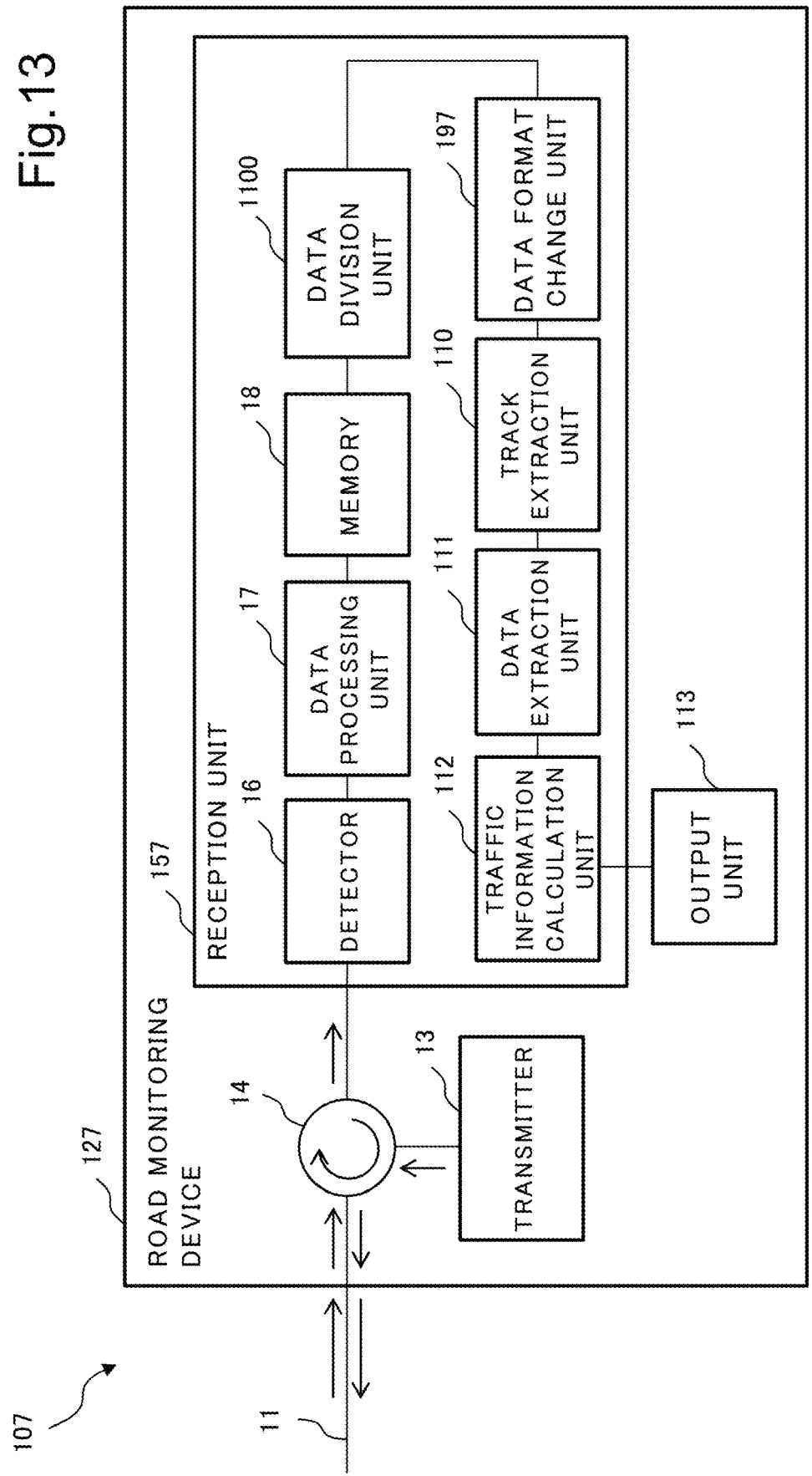
FIG. 13 is a block diagram illustrating one example of a configuration of a road monitoring system according to a fourth example embodiment of the present disclosure.

FIG. 13 is a block diagram illustrating one example of a configuration of a road monitoring system according to the fourth example embodiment of the present disclosure, A road monitoring system (107) according to the present example embodiment acquires a time series of environmental fluctuation amounts in an optical fiber cable (11). The road monitoring system (107) includes the optical fiber cable (11) and a road monitoring device (127).

The road monitoring device (127) includes a transmitter (13), a circulator (14), a reception unit (157), and an output unit (113).

The reception unit (157) includes a detector (16), a data processing unit (17), a memory (18), a data division unit (1100) (one example of a pattern transformation unit), a data format change unit (197) (one example of a pattern extraction unit and a pattern transformation unit), a track extraction unit (110) (one example of a calculation unit), a data extraction unit (111) (one example of a calculation unit), and a traffic information calculation unit (112).

The data division unit (1100) divides environmental fluctuation amount data accumulated in the memory (18) into pieces of divided data of each traffic information calculation range.

The data format change unit (197) extends divided data associated with a traffic information calculation range by a predetermined extension scale factor in distance and time directions. Further, the data format change unit (197) fills environmental fluctuation amount data in the extended range of the divided data with zero. Further, the data format change unit (197) shrinks the extended divided data in such a way that the extended divided data have a distance width and a time width each being the same as before extension.

Other configurations are the same as in the second example embodiment.

[Description of Operation]

Figure 14:
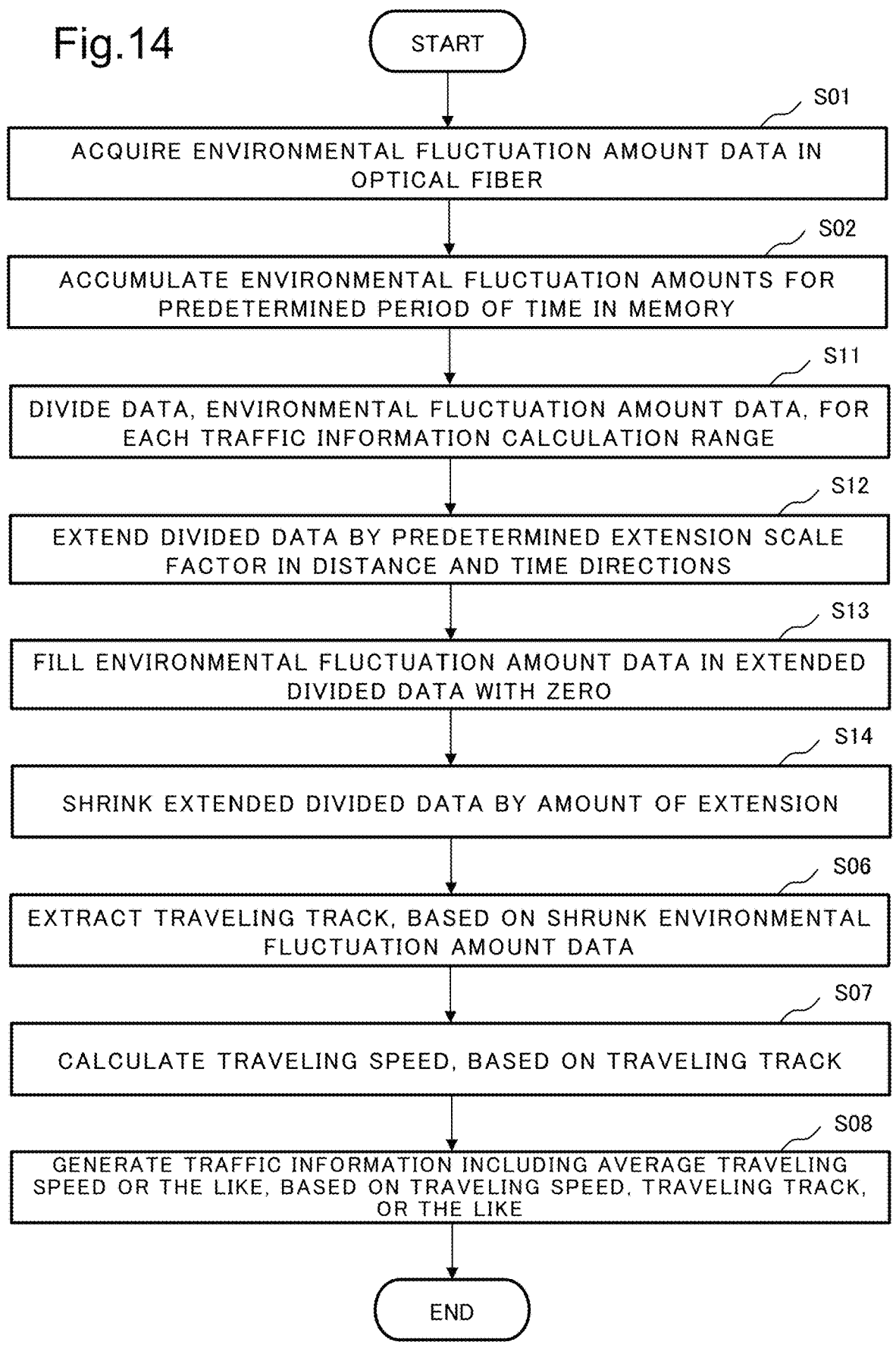
FIG. 14 is a flowchart illustrating an operation according to the fourth example embodiment of the present disclosure.

An operation of the road monitoring system (107) will be described with reference to FIGS. 13 and 14. FIG. 14 is a flowchart illustrating an operation according to the fourth example embodiment of the present disclosure.

Operations in Steps S01 and S02 are the same as in the second example embodiment.

Subsequently to Step S02, the data division unit (1100) divides environmental fluctuation amount data accumulated in the memory (18) into pieces of divided data of each traffic information calculation range (Step S11).

Then, the data format change unit (197) extends divided data associated with a traffic information calculation range by a predetermined extension scale factor in distance and time directions (Step S12).

Then, the data format change unit (197) fills environmental fluctuation amount data in the extended range of the divided data with zero (Step S13). Herein, "fill with zero" means to set a value of a background noise level for environmental fluctuation amount data in the extended range of the divided data when a detected value in the environmental fluctuation amount data fluctuates based on a detected value of a noise level as a background. When the detected value of the background noise level can be approximated by zero, the value of the background noise level to be set may be zero. Alternatively, for environmental fluctuation amount data in the extended range of the divided data, a set of values that environmental noise data measured in a place and time where no vehicle travels can take may be set.

Then, the data format change unit (197) shrinks the extended divided data in such a way that the extended divided data have a distance width and a time width each being the same as before extension (Step S14), and proceeds to processing in Step S06. Herein, the traffic information calculation range is, for example, a range of 1 km and 1 minute in a case of calculating traffic information including an average vehicle speed for 1 km×1 minute, and is a range of 2 km and 2 minutes in a case of calculating traffic information for 2 km×2 minutes.

Operations in Steps S06, S07, and S08 are the same as in the second example embodiment.

[Description of Advantageous Effect]

Figure 15:
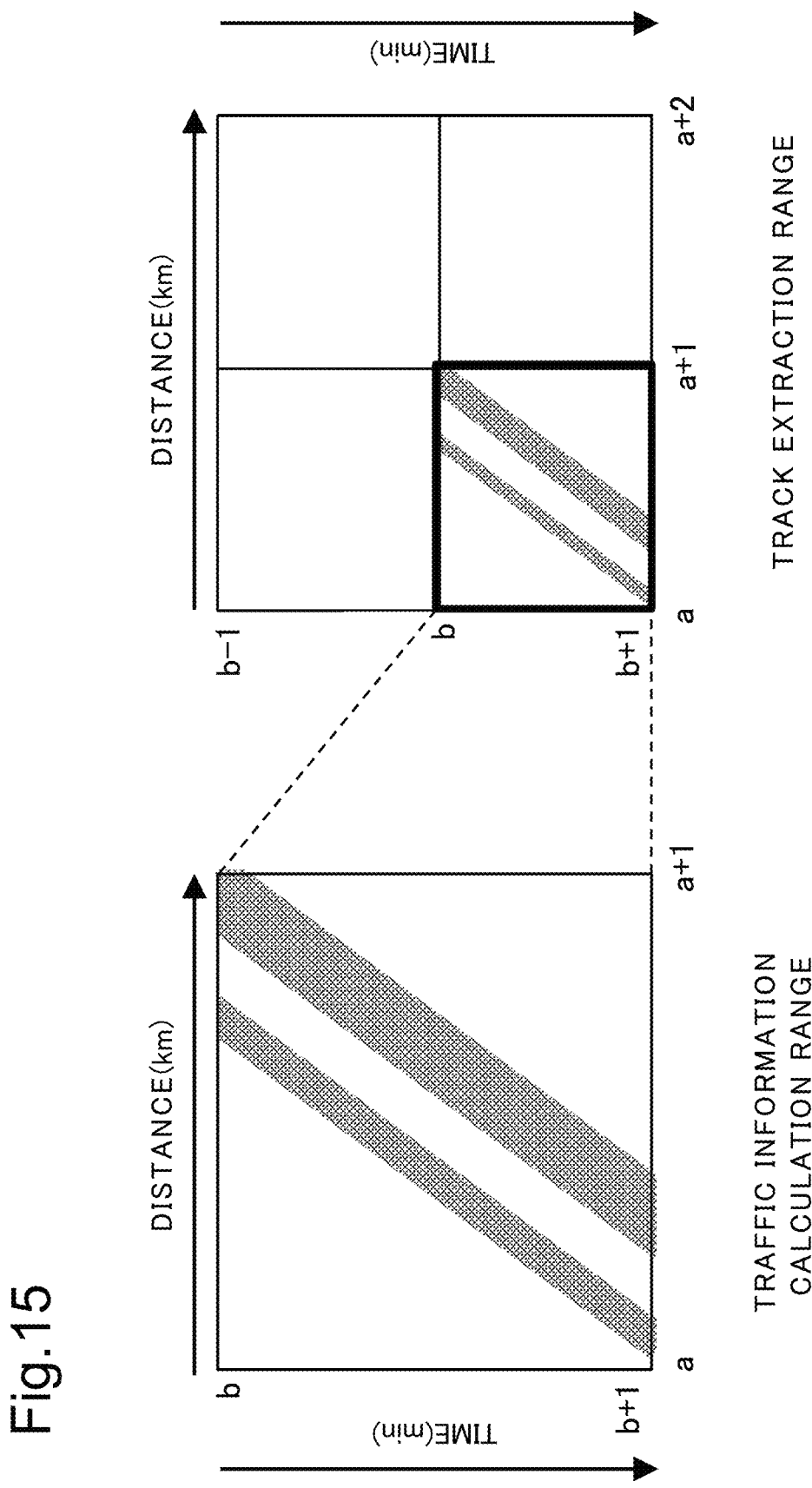
FIG. 15 is a schematic diagram illustrating an operation of clarifying an unclear traveling track.

Next, an advantageous effect of the present example embodiment will be described with reference to FIG. 15. FIG. 15 is a schematic diagram illustrating an operation of clarifying an unclear traveling track.

In the present example embodiment, environmental fluctuation amount data are divided into pieces of divided data for each traffic information calculation range, as illustrated in FIG. 15 (a left-side part in FIG. 15). Then, divided data are extended by a predetermined extension scale factor while divided data in the extended range (upper-left, upper-right, and lower-right regions in a right-side part in FIG. 15) are filled with zero. Then, the extended divided data are shrunk in such a way as to have a size being the same as before extension, and thereafter a traveling track is extracted. Thereby, even when an environmental fluctuation amount indicating a high value is broadened and unclear, a traveling track is shrunk in width and clarified. Consequently, the present example embodiment has an advantageous effect that a traveling track with a correct slope can be extracted from environmental fluctuation amount data, and precision in calculating traffic information including information relevant to a vehicle speed can be improved.

Further, the present example embodiment has an advantageous effect that required amount of memory can be reduced, since amount of environmental fluctuation amount data to be accumulated in a memory can be reduced because environmental fluctuation amount data associated with only a traffic information calculation range are used. That is, in the upper-left, upper-right, and lower-right regions in the right-side part in FIG. 15, environmental fluctuation amount data are substituted by zero.

Note that, a content of the present example embodiment is not limited to the above-described description.

In the above-described description, an example has been indicated in which environmental fluctuation amount data included in a traffic information calculation range are extended in both of distance and time directions, and are shrunk in such a way as to have a size being the same as before extension. However, in the present example embodiment, environmental fluctuation amount data included in a traffic information calculation range are extended in only a distance direction or only a time direction, and are shrunk in only an extended direction. In this case, the present example embodiment has an advantageous effect that computational amount can be reduced.

Further, in the above-described description, an example has been indicated in which the traffic information calculation unit (112) generates traffic information including an average speed or the like, based on a traveling track in Step S07, but the traffic information calculation unit (112) may output a traveling track without generating traffic information. In this case, the present example embodiment has an advantageous effect that a traveling status of an individual vehicle can be monitored.

Figure 16:
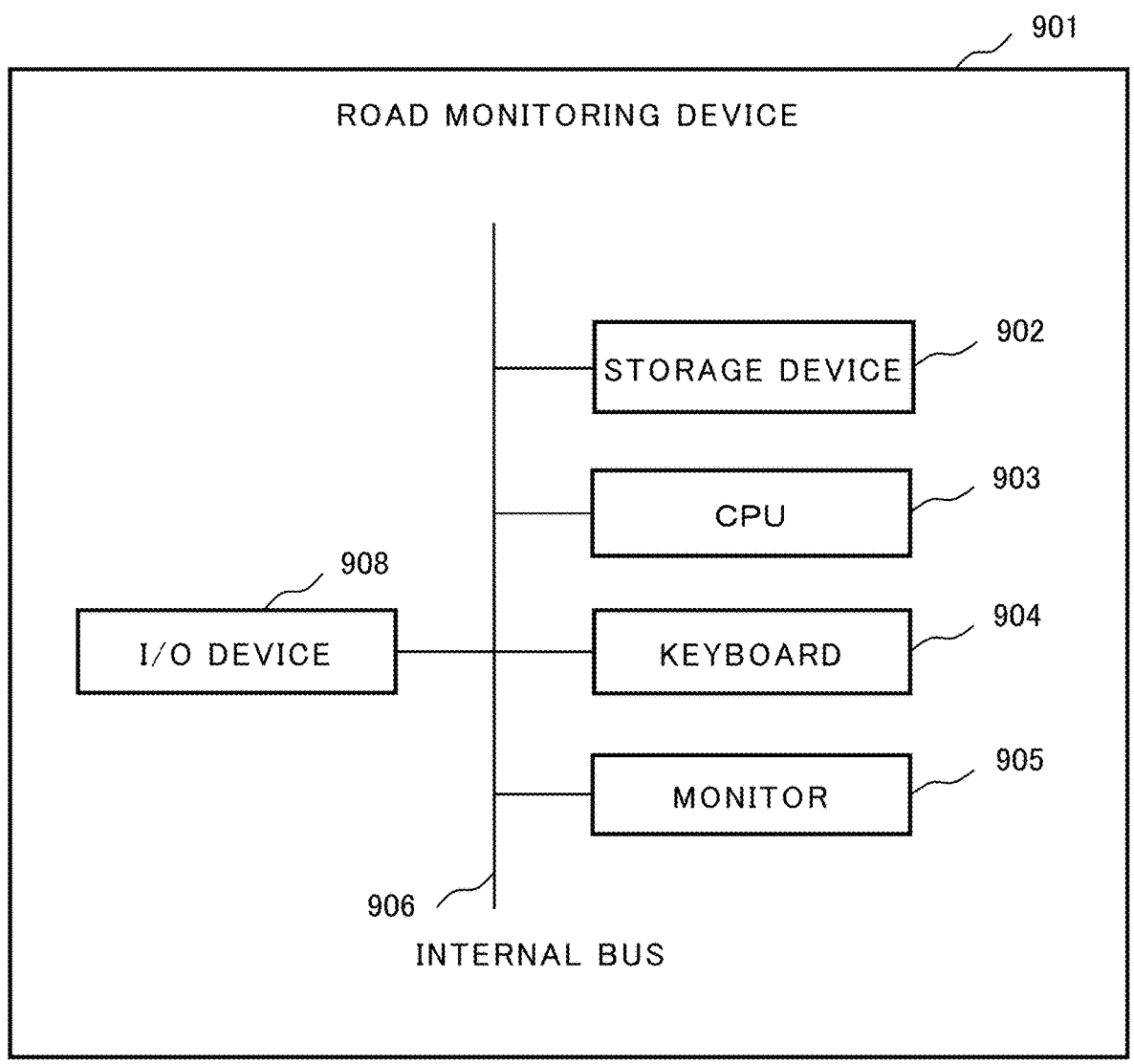
FIG. 16 is a block diagram illustrating one example of a hardware configuration that can achieve a road monitoring device according to each of the example embodiments of the present disclosure.

FIG. 16 is a block diagram illustrating one example of a hardware configuration that can achieve a road monitoring device according to each of the example embodiments of the present disclosure.

A road monitoring device 901 includes a storage device 902, a central processing unit (CPU) 903, a keyboard 904, a monitor 905, and an input/output (I/O) device 908, and these components are connected to one another by an internal bus 906. The storage device 902 stores an operation program for the CPU 903 of the reception unit 150, the pattern extraction unit 220, the pattern transformation unit 230, the calculation unit 240, the reception units 155, 156, and 157, or the like (hereinafter, referred to as a "reception unit or the like"). The CPU 903 controls the entire road monitoring device 901, executes the operation program stored in the storage device 902, and performs execution of a program for the reception unit or the like or data transmission/reception by using the I/O device 908. Note that, the above internal configuration of the road monitoring device 901 is one example. The road monitoring device 901 may have a device configuration in which the keyboard 904 and the monitor 905 are connected to each other as necessary.

The road monitoring device 901 according to each of the above-described example embodiments of the present disclosure may be achieved by a dedicated device, but can be also achieved by a computer (an information processing device), except for a hardware operation of the I/O device 908 executing communication with outside. In this case, such a computer reads out a software program stored in the storage device 902 to the CPU 903, and executes the read-out software program in the CPU 903. In a case of each of the above-described example embodiments, such a software program may include a description that can achieve functions of units of the road monitoring device illustrated in FIGS. 1, 3, 10, and 13, which have been described above. However, it is also assumed that these units include hardware as appropriate. In addition, in such a case, such a software program (a computer program) can be regarded as constituting the present disclosure. Furthermore, a computer-readable storage medium in which such a software program is stored can be also regarded as constituting the present disclosure.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims. In such a case, a new example embodiment added with such changes or modifications can also be included in the technical scope of the present disclosure. This is apparent from the matter described in the claims.

The present disclosure can be used for uses of monitoring traffic flow on a road in optical fiber sensing. Further, the present disclosure can be used for motion monitoring of a moving body such as operation monitoring of a train.

REFERENCE SIGNS LIST 100, 105, 106, 107 Road monitoring system
11 Optical fiber cable
120, 125, 126, 127 Road monitoring device
13 Transmitter
14 Circulator
150, 155, 156, 157 Reception unit
16 Detector
17 Data processing unit
18 Memory
195, 196, 197 Data format change unit
110 Track extraction unit
111 Data extraction unit
112 Traffic information calculation unit
113 Output unit
80 Extension amount calculation unit
1100 Data division unit
220 Pattern extraction unit
230 Pattern transformation unit
240 Calculation unit

What is claimed is:

1. A road monitoring device comprising:
   reception unit configured to receive an optical signal from an optical fiber cable laid along a road;
   at least one memory configured to store instructions; and
   at least one processor configured to execute the instructions to
   extract, based on the received optical signal, a first pattern according to a traveling state of a vehicle on the road in a first time range and in a first distance range,
   generate, based on the first pattern, a second pattern in which a number of time points included in the first time range or a number of positions included in the first distance range is decreased, and
   calculate a traveling speed of a vehicle on the road, based on the second pattern.

2. The road monitoring device according to claim 1, wherein
   the optical signal is backscattered light of a signal being transmitted to the optical fiber cable.

3. The road monitoring device according to claim 1, wherein
   the at least one processor calculates the traveling speed of the vehicle, based on a traveling track of the vehicle in the second pattern.

4. The road monitoring device according to claim 3, wherein the at least one processor calculates the traveling speed of the vehicle by linearly approximating the traveling track.

5. The road monitoring device according to claim 3, wherein
   the at least one processor determines the number of time points included in the first time range or the number of positions included in the first distance range in such a way that the traveling track of the vehicle in the second pattern does not disappear.

6. The road monitoring device according to claim 1, wherein
   the optical signal in a second time range included in the first time range or in a second distance range included in the first distance range is set to zero.

7. A road monitoring system comprising:
   the road monitoring device according to claim 1; and
   the optical fiber cable.

8. A road monitoring method comprising:
   extracting, based on an optical signal received from an optical fiber cable laid along a road, a first pattern according to a traveling state of a vehicle on the road in a first time range and in a first distance range;
   generating, based on the first pattern, a second pattern in which a number of time points included in the first time range or a number of positions included in the first distance range is decreased; and
   calculating a traveling speed of a vehicle on the road, based on the second pattern.

9. The road monitoring device according to claim 2, wherein
   the at least one processor calculates the traveling speed of the vehicle, based on a traveling track of the vehicle in the second pattern.

10. The road monitoring device according to claim 9, wherein
    the at least one processor calculates the traveling speed of the vehicle by linearly approximating the traveling track.

11. The road monitoring device according to claim 4, wherein the at least one processor determines the number of time points included in the first time range or the number of positions included in the first distance range in such a way that the traveling track of the vehicle in the second pattern does not disappear.

12. The road monitoring device according to claim 2, wherein
the optical signal in a second time range included in the first time range or in a second distance range included in the first distance range is set to zero.

13. The road monitoring device according to claim 3, wherein
the optical signal in a second time range included in the first time range or in a second distance range included in the first distance range is set to zero.

14. The road monitoring device according to claim 4, wherein
the optical signal in a second time range included in the first time range or in a second distance range included in the first distance range is set to zero.

15. The road monitoring device according to claim 5, wherein
the optical signal in a second time range included in the first time range or in a second distance range included in the first distance range is set to zero.

16. A road monitoring system comprising:
the road monitoring device according to claim 2; and
the optical fiber cable.

17. A road monitoring system comprising:
the road monitoring device according to claim 3; and
the optical fiber cable.

18. A road monitoring system comprising:
the road monitoring device according to claim 4; and
the optical fiber cable.

19. A road monitoring system comprising:
the road monitoring device according to claim 5; and
the optical fiber cable.

20. A road monitoring system comprising:
the road monitoring device according to claim 6; and
the optical fiber cable.

\* \* \* \* \*